J. M. PRIMM.
PITMAN CONNECTION.
APPLICATION FILED MAY 3, 1912.

1,057,270.

Patented Mar. 25, 1913.

WITNESSES:
J. Herbert Bradley.
Francis J Tomasson.

John M. Primm INVENTOR
by Christy and Christy
Atty's

COLUMBIA PLANOGRAPH CO., WASHINGTON, D. C.

UNITED STATES PATENT OFFICE.

JOHN M. PRIMM, OF LIMA, OHIO, ASSIGNOR TO THE POWER MANUFACTURING COMPANY, OF LIMA, OHIO, A CORPORATION OF OHIO.

PITMAN CONNECTION.

1,057,270.  Specification of Letters Patent.  Patented Mar. 25, 1913.

Application filed May 3, 1912. Serial No. 694,812.

*To all whom it may concern:*

Be it known that I, JOHN M. PRIMM, residing at Lima, in the county of Allen and State of Ohio, a citizen of the United States, have invented or discovered certain new and useful Improvements in Pitman Connections, of which improvement the following is a specification.

My invention relates to pitman connections, and the object of my invention is to provide a structurally efficient connection which may be readily adjusted to take up whatever loose play may arise from the wearing away of the bearings.

Figure 1:
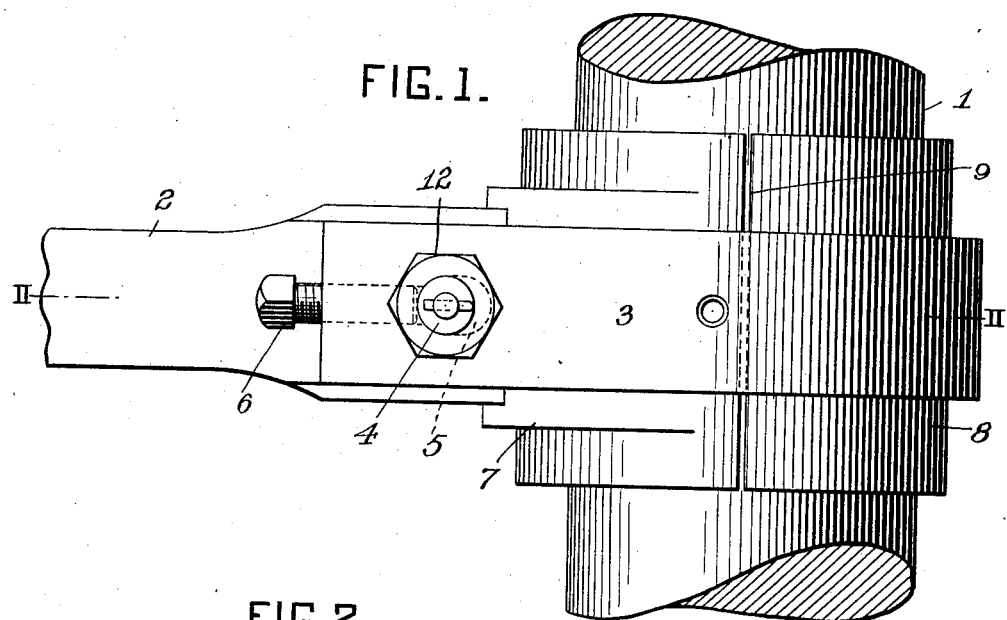
Figure 2:
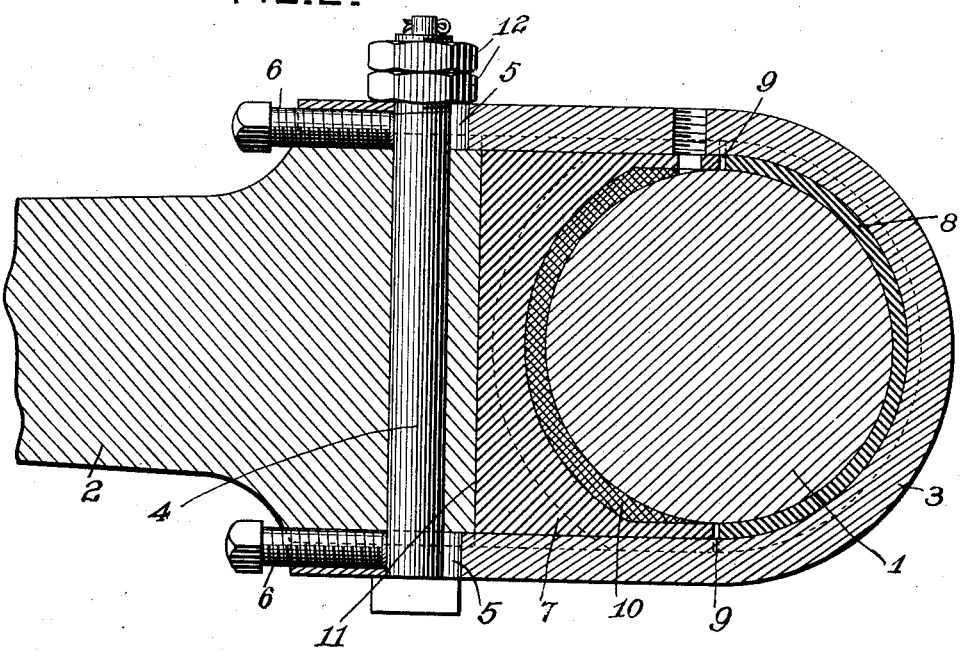

In the accompanying drawing, which forms part of my specification, and in which my invention is illustrated, Figure 1 is a plan view of a pin with a pitman connected to it; and Fig. 2 is a sectional view taken on the line II—II, Fig. 1.

Like numerals are used to designate like parts.

In the illustrative embodiment of my invention, I have shown a pin 1 secured to a pitman 2 by means of a collar or strap 3. The said pin may be any member to which it is desired to connect a pitman, and the pitman also may be of any desired form. The strap 3, which may be U-shaped as shown, engages the said pin through an interposed bearing block and is clamped to the pitman by means of a suitable clamping member, such as the bolt 4.

The pitman 2 is preferably provided with a plane bearing face 11, disposed at right angles to the line of thrust; and a correspondingly faced bearing block 7, being a portion of the split ring 7, 8, is adapted to receive the pitman thrust directly from the said pitman face. The bearing block 7 may be provided with a suitable backing of Babbitt metal 10. The parts 7 and 8 of the split ring bearing block may be suitably separated by spaces 9, as shown; and, in order to adjust the ring portion 8 to compensate for the wearing away of the bearing block, I provide means for moving the strap 3 longitudinally of the said pitman. To accomplish such an adjustment I preferably form longitudinal slots 5 in the strap 3, pass the securing bolt 4 through the said slots and through a suitable hole in the pitman 2, and I provide adjusting screws 6, adapted to bear against the said bolt. The holes for the adjusting screws may be disposed at the inner side of the strap 3, in such a manner that a portion of the screw threads of the screw 6 will be in contact with the sides of the pitman 2, so that when the bolt 4 is tightened the said adjusting screws will be locked.

In making an adjustment by the means shown herein, the nuts 12 on the bolt 4 may be loosened, and the screws 6, the ends of which bear against the bolts 4, may then be tightened. It will be clearly understood that such tightening of the screws 6 will be effective to draw the strap 3 toward the pitman 1.

I claim herein as my invention:

In a pitman connection, the combination with a pin, and a pitman; of a slot-provided strap engaging said pin and pitman, a clamping member extending through said strap-slots and the body of said pitman and being substantially immovable with relation to the longitudinal extent of said pitman, and an adjusting screw inserted in a screw-threaded hole longitudinally disposed in the body of said strap, the end of said screw bearing against said immovable clamping member and effective by a turning thereof to tighten said strap upon said pin, substantially as described.

In testimony whereof I have hereunto set my hand.

JOHN M. PRIMM.

Witnesses:
M. BRENNEMAN,
JOHN L. CABLE.

---

Copies of this patent may be obtained for five cents each, by addressing the "Commissioner of Patents, Washington, D. C."